(No Model.)
W. POUNTNEY.
LAMP KETTLE.
No. 281,791. Patented July 24, 1883.
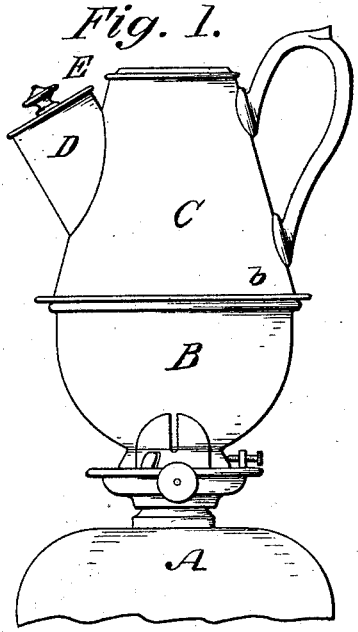
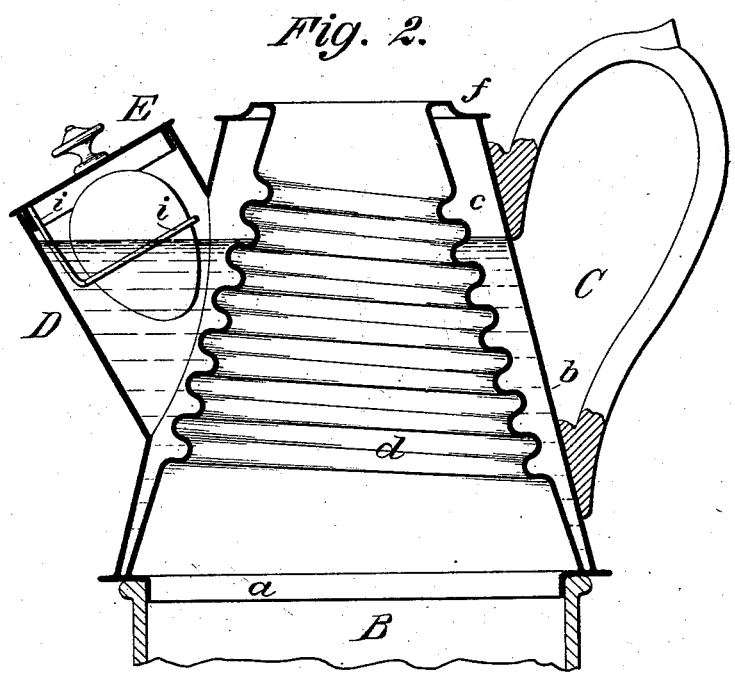
WITNESSES:
INVENTOR:
W. Pountney
BY Munn & Co
ATTORNEYS.

UNITED STATES PATENT OFFICE.

WILLIAM POUNTNEY, OF PORT JERVIS, NEW YORK.

LAMP-KETTLE.

SPECIFICATION forming part of Letters Patent No. 281,791, dated July 24, 1883.

Application filed April 10, 1883. (No model.)

*To all whom it may concern:*

Be it known that I, WILLIAM POUNTNEY, of Port Jervis, in the county of Orange, and the State of New York, have invented a new and Improved Lamp-Kettle, of which the following is a full, clear, and exact description.

This invention relates to a kettle to be used in connection with a lamp and in connection with the lower half of a sectional lamp-chimney; and it consists of the cover of the spout of the kettle having egg-holding wires, and in the combination of the same with the kettle, substantially as hereinafter more fully set forth.

Reference is to be had to the accompanying drawings, forming part of this specification, in which similar letters of reference indicate corresponding parts in both the figures.

Figure 1 is a side elevation of my new and improved lamp-kettle as it appears when placed upon the lower section of the lamp-chimney for heating, and Fig. 2 is a central sectional elevation of the kettle.

A represents a common kerosene-lamp; B, the lower half of a sectional glass globe or chimney; and C represents my new and improved kettle, which is made conical and hollow and formed with the flange $a$, adapted to fit inside of the section B, as shown in Fig. 2. The kettle C is formed of the outer conical wall, $b$, and the inner corrugated conical wall, $d$, and annular permanent covering $f$, the space $c$ between the walls $b\,d$ being the water-space, and this space is by preference made wider at the top than at the bottom of the kettle, so that the greater part of the water in the kettle will be held at the point of concentration of the heat.

D is the spout to the kettle, which is made of sufficient size to receive an egg; and E represents the cover of the spout, which is provided with the bent wires $i\,i$, that are adapted to hold an egg within the spout, as illustrated in Fig. 2.

Constructed in this manner, it will be seen that the kettle is adapted for heating water and boiling eggs at the same time, and by making the kettle conical and adapting it for use in connection with the section B of the chimney, it will be seen that, while heating, the light given by the lamp is in no manner interfered with, as the kettle produces the same draft that the upper section of the chimney would. Besides, the kettle is cheap and convenient, and, owing to the corrugations of the wall $d$ and the distribution of the water in the space $c$, the water will become heated in a very short space of time.

Having thus described my invention, I claim as new and desire to secure by Letters Patent—

1. The cover provided on its inside with egg-holding wires, in combination with the kettle having the large spout, substantially as and for the purpose set forth.

2. The cover E, provided with the egg-holding wires $i\,i$, in connection with the double-walled kettle C, having the larger spout D, substantially as and for the purposes set forth.

WILLIAM POUNTNEY.

Witnesses:
  H. A. WEST,
  C. SEDGWICK.